United States Patent [19]

Henson et al.

[11] Patent Number: 4,596,849

[45] Date of Patent: Jun. 24, 1986

[54] CORROSION INHIBITORS FOR ALKANOLAMINES

[75] Inventors: Edwin R. Henson, Lake Jackson; Joel G. Courtwright, Angleton; Tipton T. Masterson, Lake Jackson, all of Tex.

[73] Assignee: The Dow Chemical Company, Midland, Mich.

[21] Appl. No.: 665,839

[22] Filed: Oct. 29, 1984

[51] Int. Cl.[4] .................................................. C08K 5/09
[52] U.S. Cl. ..................................... 524/398; 524/413; 524/597; 252/391; 252/389 R
[58] Field of Search .................. 524/413, 597, 398; 528/252, 262, 263; 252/189, 389, 53, 391

[56] References Cited

U.S. PATENT DOCUMENTS

| | | | |
|---|---|---|---|
| 2,110,489 | 3/1938 | Kraus et al. | 528/262 |
| 2,211,710 | 8/1940 | Zerweck et al. | 528/252 |
| 2,317,181 | 4/1943 | D'Alelio | 528/262 |
| 2,379,691 | 7/1945 | D'Alelio | 528/263 |
| 3,260,538 | 7/1966 | Gardner | 252/391 |
| 3,294,695 | 12/1966 | Tippett | 252/391 |
| 3,810,854 | 5/1974 | Doi et al. | 528/262 |
| 3,819,328 | 6/1974 | Go . | |
| 4,096,085 | 6/1978 | Holoman et al. . | |
| 4,143,119 | 3/1979 | Asperger et al. . | |
| 4,317,744 | 3/1982 | Levi . | |

OTHER PUBLICATIONS

B. G. Hofmeyer, H. G. Scholten, W. G. Lloyd, "Contamination and Corrosion in Monoethanolamine Gas Treating Solutions"–Report No. 722, The Dow Chemical Co.

"Gas Conditioning Fact Book", The Dow Chemical Co., Midland, Michigan, pp. 145–152 and 157–158 (1962).

R. Perry, C. Chilton and S. Kirkpatrick, Chemical Engineers Handbook, 4th Ed., Ch. 23 (1963).

M. G. Fontana and N. D. Greene, Corrosion Engineering, 2nd Ed., pp. 7–27 (1978).

*Primary Examiner*—Lewis T. Jacobs
*Attorney, Agent, or Firm*—Benjamin G. Colley

[57] ABSTRACT

This invention relates to a corrosion inhibiting composition for ferrous metals and its alloys in gas conditioning service using aqueous monoethanolamine to scrub carbon dioxide containing oxygen. The corrosion inhibiting composition includes a thiourea-amine-formaldehyde based polymer and, in the preferred embodiment, also includes a cupric ion producing material.

8 Claims, No Drawings

CORROSION INHIBITORS FOR ALKANOLAMINES

BACKGROUND OF THE INVENTION

1. Field of the Invention

This invention relates to chemical corrosion inhibitors which have demonstrated utility in the control of acid gas corrosion. The invention also relates to the method for preparing the corrosion inhibitors and to their use in gas conditioning services.

2. The Prior Art

The corrosion inhibitors of this invention have utility in any gas stream that contains carbon dioxide. The presence of carbon dioxide and resulting necessity for its stripping by gas treatment services, i.e. monoethanolamine, inherently results in a corrosion problem. The corrosion problem is typically attacked by use of chemical corrosion inhibitors. The gas streams for which the corrosion inhibitor of this invention are necessary are created from a number of sources including flue gas from power plants, natural gas from wellheads and petroleum refineries. The source of gas is not limiting on the use of this invention.

One of the most common mechanisms for the stripping of carbon dioxide from gases is monoethanolamine (sometimes referred to as "MEA"). The use of MEA in the treatment of acid gases is described in a paper ("Contamination and Corrosion in Monoethanolamine Gas Treatment Solutions"—Report #722, B. G. Hofmeyer, H. G. Scholten, W. G. Lloyd of the Dow Chemical Company) presented before the Dec. 1, 1955 meeting of the Petroleum Section of The American Chemical Society in Dallas, Tex. Although MEA is only one of several known chemicals for the treatment of acid gases, the thiourea-amine-formaldehyde corrosion inhibitor of this invention has shown exceptional utility in combination with MEA used at concentrations of greater than 15% by weight.

In petroleum refining operations, a distillation procedure is used to separate various fractions from the petroleum crude. The recovered fractions are cooled, condensed, and sent to collecting equipment. No matter what the source of oil that is subject to distillation it has been found that corrosion of the equipment takes place. Acidic materials that are present in all crudes are carried along from the distillation zone with the distillate product and often cause extensive corrosion to take place on the metal surfaces of fractionating towers such as crude towers, trays within such towers, heat exchangers, receiving tanks, connecting pipes, etc.

The most serious corrosion occurs in condensers and in the overhead line leading from the fractionating towers. The overhead line is used as a connection between the distillation tower and condensers. The distillate or stock which will be stored or used subsequently to charge other refining processes is condensed on the cooling surfaces of the condenser equipment and is then caught in an overhead accumulator drum. A portion of the distillate is recycled to the crude pot with the remainder being transferred to other refinery units. Refineries are but one example of areas where corrosion inhibitors are essential.

The conditioning of gases, both natural and synthetic, i.e., acid gas stripping, and the removal of acid gases, e.g., $CO_2$, $H_2S$ and COS, by absorption of the acidic gases in a liquid absorbent medium, has been practiced for many years. Various absorbents, such as the alkanolamines, "sulfolane" (tetrahydrothiophene-1,1-dioxide), "sulfinol" (tetrahydrothiophene-1,1-dioxide+diisopropanolamine, potassium carbonate and the like have been used commercially.

Each of the commercial gas conditioning systems is plagued by corrosion problems, some of which result from decomposition of the absorbent, some from reaction between the acidic components of the gases treated and the absorbent, and all, to more or less the same degree, from attack by the acidic components of the gases treated upon the metals of construction of the equipment. Generally, the corrosion occurs in the regenerator, heat exchangers, pumps and piping associated with these elements of the overall equipment.

Numerous compounds have been suggested as additives to the absorbents to prevent the corrosion and/or deformation of corrosive elements. For example, copper sulfate was used for three years in a 15% monoethanol amine gas processing plant for removing 10% carbon dioxide from the gas. Corrosion was observed as a decrease in reboiler and heat exchange tube life and on analysis of the amine solution, only a few parts per million copper was found, thus indicating excessive copper deposition in the unit. (Gas Conditioning Fact Book, The Dow Chemical Co., Midland, Mich., 1962, pp. 157-158, Case No. 8).

Each of these chemicals and others which are available in the prior art address the problem of general corrosion. General corrosion is electrochemical in nature. Corrosion is a familiar term and generally is understood to represent the gradual wearing away by chemical or electrochemical means of metal. Although corrosion is typically understood to result when metal, especially ferrous metals, are maintained in prolonged contact with water, it is generally understood that corrosion can occur upon contact of metals with any liquid. For purposes of this application corrosion shall be generally understood to include reference to a uniform thinning and loss of metal not accompanied by localized action such as pitting, cracking, or erosion which results from direct chemical reaction or combination such as that which occurs where metal is corroded in gases or by electrochemical action like that which occurs with metals and alloys corroding in liquids. For additional information on corrosion in general reference is made to R. Perry, C. Chilton and S. Kirkpatrick, *Chemical Engineers Handbook*, 4th ed., Ch. 23 (1963).

A common problem encountered in steel equipment used for handling solutions containing hydrogen sulfide ($H_2S$) is hydrogen blistering and cracking. Hydrogen blistering and cracking is a form of corrosion which is generated by the presence of atomic hydrogen. Atomic hydrogen is changed to molecular hydrogen which can penetrate steel. The penetration of steel by the atomic hydrogen results in increased corrosion and increased corrosion rates. Where the problem is recognized as hydrogen blistering and cracking amine type inhibitors have typically been found effective in preventing corrosion. This problem is especially acute in petroleum distillation equipment made out of steel and steel alloys.

Corrosion is a universally recognized phenomenon which is inherent in the use of steel and steel alloys especially ferrous containing steel alloys. The corrosion phenomenon has been the basis for a great deal of research to define methods, procedures and chemicals to control corrosion. Factors which have been shown to effect the occurrence and rate of corrosion include:

temperature, velocity, pH, oxidizing and reducing conditions and moisture.

Temperature has been shown to have a dramatic effect on corrosion and especially on the rate of corrosion. As reaction kinetics would predict, practice has shown that corrosion and corrosion rates are higher at higher temperatures. The increase in corrosion and corrosion rates at higher temperatures is especially pronounced in an acid environment. For purposes of this application the temperature range in which the corrosion inhibiting composition will be expected to function is from ambient temperatures to 150° C.

The velocity of the liquid, gas or solution which causes corrosion in the distillation column or other metal structure is directly related to the rate of corrosion. Practice has shown that the higher the velocity the higher the corrosion and rate of corrosion. It is theorized that increased velocity may be responsible for the removal of protective films or scale or simply provide a greater supply of corroding media.

Although the pH of a specific solution which includes corrosion causing media is an important factor in determining corrosion and corrosion rates it is a very complex factor. Ideally, the solution should be at a neutral pH. This would result in the minimum rate of corrosion. However, deviations from neutral to either the acidic (lower) or alkaline (higher) pHs will inevitably result in increased rates of corrosion. As a general rule, a decrease in pH value will result in an increase in the corrosion and corrosion rates of metals subject to corrosion in dilute acid solutions while an increase in pH value above neutral range will result in an increase in corrosion and corrosion rates of metals subject to attack in alkaline solutions.

Moisture is a critical factor in determining corrosion and corrosion rates. The effects of moisture are especially dramatic when its presence results in a change from anhydrous conditions and acidic components are formed by hydrolysis. The presence of moisture is also important in gaseous systems since its presence can cause condensation and present the opportunity for severe corrosion. In general, the occurrence or presence of moisture in an environment will cause an increase in corrosion compared with a moisture free condition.

Finally, the general oxidizing and reducing conditions present in the environment can have a severe effect on corrosion and corrosion rates. In particular, it is noted by practitioners that the chemical and electrochemical nature of the corrosion reaction results in reaction kinetics which are favorably affected by an environment presenting oxidation and reduction conditions.

Although corrosion has been recognized as a problem in the design of steel and other ferrous metals the attempts to eliminate or control corrosion have been varied. The methods of attacking corrosion in the prior art have included: selecting specific materials for specific applications, attempts to use design criteria to minimize corrosion, attempts to alter the environment to provide corrosion retardant conditions, the use of cathotic protection devices, the use of various coatings and linings which are resistant to corrosion, and finally the use of chemical inhibitors. While under proper circumstances each of the prior art methods is effective to a degree it has been the use of chemical corrosion inhibitors which has been the preferred method for controlling corrosion.

Corrosion inhibitors in general are effective as a result of their control over the influence on the cathode or anode area reations which form the basis for the electrochemical corrosion reaction. In particular, the chemical inhibitors are designed to control corrosion reaction kinetics and to minimize same. Organic sulfide and amine materials are frequently effective in minimizing corrosion of iron and steel in an acid solution.

Patents which have been identified as relevant to the corrosion inhibitor composition of this invention are U.S. Pat. Nos. 3,819,328; 4,096,085; 4,143,119 and 4,317,744.

U.S. Pat. No. 3,819,328 discloses a corrosion inhibitor for use in columns characteristically used in petroleum distillation processes. The patent discloses alkaline polyamines such as ethylene diamine, to control acid corrosion in distillation columns. Preferably the alkylene polyamine is used in conjunction with a corrosion inhibitor, e.g., a film forming corrosion inhibitor, i.e., morpholine, at regulated pHs of about 2. The corrosion of columns which have water condensors and which water has a high pH due to acidic materials such as $H_2S$, HCN, $CO_2$, HCl, etc. is taught to be controlled. The patent also teaches a wide variety of nitrogen based, film forming corrosion inhibitors.

U.S. Pat. No. 4,096,085 discloses a corrosion inhibitor composition used in gas scrubbing systems having amine compounds such as polyethylene amines combined with copper metal or a copper ion yielding compound. This patent discloses a corrosion inhibited acid gas treating solution which includes an amine compound having a specific molecular structure, copper or a copper ion yielding compound and sulfur or a sulfur atom yielding compound.

U.S. Pat. No. 4,143,119 relates to a copper based corrosion inhibitor composition and a method for employing the composition to prevent corrosion of metal in contact with acid gases.

U.S. Pat. No. 4,317,744 discloses a corrosion inhibitor which includes effective amounts of a water soluble phosphonic acid or salt; polymers of acrylic, methacrylic, maleic or its anhydride and tolyltriazole.

SUMMARY OF THE INVENTION

The corrosion inhibiting composition of this invention is a thiourea-amine-formaldehyde polymer and, in its more preferred format, the polymer is used in combination with a copper (II) salt such as basic copper carbonate or a copper (II) complex. Use of the corrosion inhibiting composition of this invention results in the control of corrosion in mild steel piping and vessels which are used in gas conditioning service. The invention has shown special utility in those gas conditioning services using 30% aqueous monoethanolamine (MEA) to scrub carbon dioxide containing oxygen.

Use of the corrosion inhibiting composition of this invention and the method of use disclosed in this invention result in consistently lower corrosion rates. The corrosion inhibitor of this invention is resistant to reduction and use of the corrosion inhibitor of this invention in the process of this invention results in corrosion protection under a wide range of conditions. Furthermore, the corrosion inhibitor of this invention does not degrade to hydrogen sulfide.

DESCRIPTION OF THE PREFERRED EMBODIMENT

The Corrosion Inhibitor

The corrosion inhibitor of this invention has demonstrated utility in a variety of acid gas containing fluid streams where corrosion inhibition is necessary. The preferred use is in combination with an MEA gas treatment service although utility has been demonstrated for a variety of acid gas treatment services.

Condensation of water that is carried over in the overhead line presents one of the most difficult problems in the area of corrosion control. This is especially prevalent in flue gas from power plants and natural gas from wellheads. The condensate formed after the vapor leaves the column contains a high percentage of acidic materials such as hydrogen sulfide, hydrogen cyanide, carbon dioxide, hydrochloric acid, etc. Due to the high concentration of acids dissolved in the water, the pH of the condensate is quite low. For this reason the water is highly corrosive. It is important therefore, that the condensate be rendered less corrosive.

It is generally accepted that the corrosion forming reaction cannot be generically described. The corrosion reaction and mechanism thereof is characterized by the participating chemical reactants and the environment of the reaction. Therefore, in formulating a corrosion inhibitor it is necessary to synthesize the inhibiting composition specifically for the intended application. Although it has been contemplated that a universal corrosion inhibitor might be formulated which inhibited any chemical reaction, including the corrosion forming reaction, this has not been felt possible in the past for a number of reasons. First and foremost is the requirement that reaction kinetics continue to take place in the solution in the corrosion causing solution. Therefore, chemicals which generally inhibit the reactivity of such a solution are actually detrimental to the primary purpose of the chemical itself. Therefore, the formulation, synthesis and use of corrosion inhibitors is an area of chemistry which is complex and specific to individual applications.

The preferred application to which the corrosion inhibitor of this invention is directed is the control of corrosion in mild steel piping and vessels. For purposes of this application, the term mild steel should be understood to mean carbon-based steel. In particular, the corrosion inhibitor of this invention has shown utility in controlling and reducing the rate of corrosion in gas conditioning services using aqueous monoethanol amine (MEA) to scrub carbon dioxide ($CO_2$) containing oxygen (4–8%). MEA is typically present in an amount of up to 50% by weight and functions as an absorbant for acid gases. Although the specific use to which this corrosion inhibitor is placed is not intended to be a limiting feature of the invention it should be understood that dramatic improvements in corrosion and corrosion rates have been demonstrated for such a system.

The corrosion inhibitor of this invention is chemically described as a thiourea-amine-formaldehyde polymer composition. In the most preferred embodiment, the thiourea-amine-formaldehyde polymer is combined with a copper (II) salt such as copper carbonate or a copper (II) complex. The preferred inhibitor is generically described as a thiourea-amine-formaldehyde based polymer in combination with a cupric ion producing material.

The most preferred amine for use in the thiourea-amine-formaldehyde composition is aminoethylpiperazine. Other primary and secondary amines can also be substituted for the aminoethylpiperazine. In addition to substitution of primary and secondary amines it is possible to use other substituted thioureas in place of thiourea. Other aldehydes and dialdehydes can be substituted for formaldehyde.

The most preferred cupric ion producing material is copper carbonate. However, other copper (II) salts or copper (II) complexes will also show the desired activity.

Method for Preparing the Corrosion Inhibitor

The preferred thiourea-aminoethylpiperazine-formaldehyde polymer is prepared by mixing 1 mole of thiourea and 1 mole of aminoethylpiperazine in approximately 200 ml. of deionized and distilled water. To the first solution 3 moles of formaldehyde (Baker Chemical Co., 37% in water) is added slowly with vigorous stirring. The temperature is maintained at or below 50° C. This procedure will result in an amber mixture which must be mixed for approximately 1 hour.

The mixture obtained after mixing may be used as is or dried under vacuum to obtain a yellow solid. Elemental analysis of the solid material reveals a carbon content of 47.85%, a hydrogen component of 7.84%, a nitrogen component of 26.62% and a sulfur content of 11.99%.

The copper complex is prepared by adding 1 mole of 1,3-propane diamine (Aldrich Chemical Co.) to approximately 1400 ml of methanol while stirring. One mole of concentrated hydrochloric acid (HCl) is added dropwise to the methanol solution while stirring and under conditions such that the temperature stays at or below 35° C. The resulting solution is cooled to 5° C. with an ice bath. A white precipitate is formed.

To the mixture in the ice bath 1 mole of glyoxal (Aldrich Chemical Co., 40% in water) is added dropwise with vigorous stirring. The addition takes place under conditions such that the temperature stays at or below 10° C. Upon completion of the addition of glyoxal the solution is removed from the ice bath and allowed to come to room temperature or become homogenous, whichever occurs first. This is accomplished while stirring continues to take place. At that time 1 mole of copper (II) as copper acetate monohydrate (Baker Chemical Co.) is added and the resulting mixture is stirred for 3 hours.

After the stirring operation has taken place 1 mole of concentrated hydrochloric acid is added dropwise. A green precipitate is formed. The green precipitate is filtered and dried. The elemental analysis of the resulting mixture is a carbon content of 18%, a hydrogen content of 4.10%, a nitrogen content of 11.10%, a chlorine content of 35.7% and a copper content of 20%.

The thiourea-aminoethylpiperazine-formaldehyde polymer can be used as a corrosion inhibitor or can then be added to the copper complex or copper ion producing material and they can be used in effective amounts for controlling corrosion in mild steel piping and vessels.

Method for Using the Corrosion Inhibitor

In actual operation the corrosion inhibitor of this invention has been shown to perform effectively from ambient temperatures up to 150° C. The most preferred range for functional operability of the corrosion inhibitor of this invention is 120° C. to 140° C. The two components of the corrosion inhibitor of this invention are added in the ratio of 2 parts thiourea polymer to 1 part cupric ion producing material to 4 parts thiourea polymer to 1 part cupric ion producing material. A preferred ratio of addition is 2.6 parts of thiourea polymer to 1 part of cupric ion producing material and the most preferred actual example is 1600 parts per million of thiourea polymer to 600 parts per million of cupric ion producing material. The combined materials form the corrosion inhibitor of this invention and are added to the fluid stream. Typically, the corrosion inhibiting material is added to the gas treatment material, i.e. MEA, prior to addition to the gas stream.

The resulting corrosion inhibitor is used to control corrosion and corrosion rates in mild steel piping and vessels. It has been demonstrated that the use of the corrosion inhibiting composition of this invention results in lower corrosion rates, a resistance to chemical reduction, corrosion protections under a wide range of conditions and a corrosion inhibitor which does not degrade to the highly corrosive hydrogen sulfide.

The precise mechanism for the protection offered by the corrosion inhibitor of this invention is not completely understood. It is contemplated that the mechanism of protection is the formation of magnetite ($Fe_3O_4$) on the steel surface. The tightly bound crystalline structure of magnetite prevents corrosion from reaching the metal surface itself. This conclusion is based on a spectroscopic analysis of the surfaces of corrosion inhibited materials.

The corrosion inhibitor is typically added to the adsorbent, such as MEA, and then metered into the gas stream in preselected concentrations. The thiourea-amine-formaldehyde polymer can be dissolved in the MEA or the corrosion inhibitor can be separately but simultaneously metered into the gas stream with the MEA. The particular method of addition is not critical and is, in large part, dependent on the configuration of the gas stream and the specific adsorbent material being used. When using the preferred corrosion inhibitor of this invention, thiourea-amine-formaldehyde polymer in combination with a cupric ion producing material, the same methods of addition may be used. For example, both the polymer and cupric ion producing material can be dissolved in MEA, the cupric ion producing material can be separately dissolved and separately but simultaneously added to the gas stream or all three materials, i.e. MEA, polymer and cupric ion producing material, can be separately metered into the gas stream. In the most preferred process, the polymer and cupric ion producing material are dissolved in the MEA and then the combination of MEA and corrosion inhibitor is metered into the gas stream.

In acid gas treatment systems where MEA is the active absorbent chemical, from 15% to 30% by weight MEA is considered to be both an effective and economic range of addition. At concentrations of MEA up to 15%, the necessity for a corrosion inhibitor is limited while at concentrations above 30%, the economics of the addition of a corrosion inhibitor are severely diminished.

Test Procedure

Corrosion is a gradual process. It is important to have a test procedure by which corrosion inhibition can be tested in a limited period of time. The test procedure used to determine the effectiveness of compounds as corrosion inhibitors by the inventors herein includes the following steps. A test solution, aqueous 30% monoethanol amine (1,025 gms), is saturated with carbon dioxide. The corrosion inhibitor to be tested is added in the desired amount. The resulting solution is poured into a 2 liter Parr autoclave which is equipped with a stirrer. Next the autoclave is pressurized with 200 psig of air, heated to the desired temperature and stirred at 600 rpms for 24 hours. Corrosion rates are determined by using steel coupons placed in the test solution before the start of a test.

The coupons are cleaned prior to a test in the following manner; pickled in 1:1 hydrochloric acid, washed with soap and water, rinsed with water, then acetone and then air dried. At the end of a test, the coupons are cleaned in the same manner with the exception that a commercial hydrochloric acid inhibitor (such as Dowell A120) is added to the 1:1 hydrochloric acid. The purpose is to remove only corrosion deposits.

The corrosion rate is then calculated according to the following formula:

$$\text{Corrosion rate (mils/yr)} = \frac{534 \times \text{mgs weight loss of coupon}}{(\text{Coupon density, gms/cc})(\text{coupon surface, in.}^2)(\text{hrs.})}$$

Based on experimentation, some of which is included in the examples which follow, the inventors have synthesized and produced a corrosion inhibitor which is substantially superior to the corrosion inhibitors which are commercially available for gas conditioning services using alkanolamines to scrub carbon dioxide containing oxygen. The current commercial corrosion inhibitors include ammonium thiocyanate (NH$_4$SCN) diethylthiourea (DETU) and basic copper carbonate ($CuCO_3xCu(OH)_2$).

The following examples are provided as exemplary of the corrosion inhibitor of this invention. The examples are illustrative only and are not intended to be limiting on the corrosion inhibiting composition or methods disclosed. The examples are provided to not only show the advantages of using the corrosion inhibiting composition of this invention but also to compare the use of the corrosion inhibiting composition of this invention to commercially available corrosion inhibitors.

EXAMPLE 1

A thiourea-aminoethylpiperazine-formaldehyde polymer is prepared in accordance with the procedure and method disclosed herein. The polymer composition is combined with a copper (II) complex also prepared in accordance with the method and procedures of this disclosure. The polymer and copper complex are combined to form a corrosion inhibitor which is then tested in the manner described herein. The reports of the results of the test are reported in Table 1. The corrosion inhibitor was tested at 120° C., 140° C. and 150° C. for approximately 18.5 hours. The results are reported in Table 1. Clearly the conclusion can be drawn that the corrosion inhibitor of this invention prepared in accordance with the process of this invention and used in accordance with the process of this invention showed dramatically superior results over the corrosion inhibitors which are represented by the prior art as shown in Examples 3–6.

EXAMPLE 2

A corrosion inhibitor consisting of a combination of thiourea-aminoethylpiperazine-formaldehyde as prepared in Example 1 and basic copper carbonate (0.72 gms, 400 part for per million copper) was tested in the same manner described in Example 1 at 120° C. and 140° C. for approximately 20.5 hours. The results are reported in Table 1 and clearly show superior results to that achieved by the prior art corrosion inhibitors of Examples 3-6.

EXAMPLE 3

Basic copper carbonate (0.72 gms, 400 part per million copper) was tested in the manner described in Example 1 in the absence of the thiourea based polymer at 120° C. and 140° C. for approximately 20 hours. The results are reported in Table 1.

EXAMPLE 4

The corrosion inhibitor tested was diethylthiourea (0.41 gram, 400 part per million) plus nickel sulfate hexahydrate (0.23 gram, 50 part per million nickel). This material was tested in the manner described in Example 1 at 120° C. and 140° C. for approximately 17 hours. The results are reported in Table 1.

EXAMPLE 5

The corrosion inhibitor tested was ammonium thiocyanate (0.41 grams, 400 parts per million) plus nickel sulfate hexahydrate (0.23 grams, 50 part per million nickel). These materials were tested in the manner described in Example 1 at 120° C. and 140° C. for approximately 18.5 hours.

EXAMPLE 6

A control solution was tested which was not inhibited. Again this material was tested in the manner described in Example 1 at 120° C. and 140° C. for approximately 18.5 hours. The results are reported in Table 1.

TABLE 1

CORROSION INHIBITION OF MILD STEEL CONTAINING 30% MONOETHANOLAMINE, SATURATED WITH CARBON DIOXIDE, AIR PAD

| Example | Corrosion Inhibitors | Ratio: polymer to ion prod. mat. | Avg. Corr. Rate (mpy) 120° C. | 140° C. | 150° C. |
|---|---|---|---|---|---|
| 1. | thiourea-aminoethyl-piperazine-formaldehyde + copper(II) complex | 1600/600 | 3 | 10 | 37 |
| 2. | thiourea-aminoethyl-piperazine-formaldehyde + basic copper carbonate | 1600/400 | 32 | 54 | — |
| 3. | basic copper carbonate | 400 | 541 | 218 | — |
| 4. | DETU + nickek(II) | 400/50 | 429 | 357 | — |
| 5. | NH4SCN + nickel(II) | 400/50 | 450 | 285 | — |
| 6. | uninhibited | — | 175 | 412 | — |

It should be understood that the testing in Examples 1 through 6 and the results reported in Table 1 represent laboratory tests which are designed to simulate "worst case" conditions. Actual field conditions would be less stringent and rates of corrosion would be lower. Typically, in actual practice, if a corrosion rate is found to be between 30 and 100 mils per year, a corrosion inhibitor would be required. In the accelerated testing using laboratory coupons, the prevailing conditions may cause what appear to be extremely high corrosion rates. It is unusual to encounter these conditions or corrosion rates in actual practice. For instance, selecting 120° C. as a testing temperature represents an exceptionally high temperature and perhaps even the maximum temperature under which such corrosion inhibition could be initiated. In actual practice, the temperature of the gas streams is substantially lower. Therefore, the results indicating that Examples 1 and 2, which are based on the corrosion inhibitor of this invention, show superior results even at temperatures of 150° C. which is a temperature well beyond conventional practice.

What is claimed is:

1. A corrosion inhibiting composition for ferrous metals and its alloys in gas conditioning service using aqueous monoethanolamine to scrub carbon dioxide containing oxygen comprising:
   (a) a thiourea-aminopiperazine-formaldehyde polymer, and
   (b) a cupric ion producing material selected from the group consisting of copper (II) salts, copper (II) complexes and combinations thereof, wherein said thiourea-aminopiperazine-formaldehyde polymer is combined with said cupric ion producing material in a ratio of from 2 to 4 parts thiourea-aminopiperazine-formaldehyde polymer to 1 part cupric ion producing material.

2. The corrosion inhibiting composition of claim 1 wherein said copper (II) salt is copper carbonate.

3. The corrosion inhibiting composition of claim 1 wherein said copper (II) complex is cupric acetate monohydrate.

4. The corrosion inhibiting composition of claim 1 wherein said polymer is thiourea-aminoethylpiperazine-formaldehyde.

5. The corrosion inhibiting composition of claim 1 wherein said cupric ion producing material is selected from the group consisting of: copper (II) salts, copper (II) complexes and combinations thereof.

6. The corrosion inhibiting composition of claim 5 wherein said copper (II) salt is basic copper carbonate.

7. The corrosion inhibiting composition of claim 5 wherein said copper (II) complex is cupric acetate monohydrate.

8. A process for the preparation of a corrosion inhibiting composition comprising the steps of:
   (a) preparing an aqueous solution by mixing a thiourea with a primary or secondary amine;
   (b) adding formaldehyde to said aqueous solution with stirring and under conditions such that temperature is maintained at or below 50° C.;
   (c) preparing a solution of cupric ion producing material in alcohol by mixing a cupric ion producing material selected from the group consisting of: copper (II) salts, copper (II) complexes and combinations thereof in alcohol and combining the resulting solution with hydrochloric acid;
   (d) separating the cupric ion producing precipitate from said solution; and
   (e) combining said aqueous solution with said cupric ion producing precipitate in a ratio of 2 to 4 parts aqueous solution to 1 part cupric ion producing precipitate.

* * * * *